March 2, 1965     G. F. MORRIS     3,172,107
TACAN TEST EQUIPMENT
Filed March 18, 1963     2 Sheets-Sheet 1
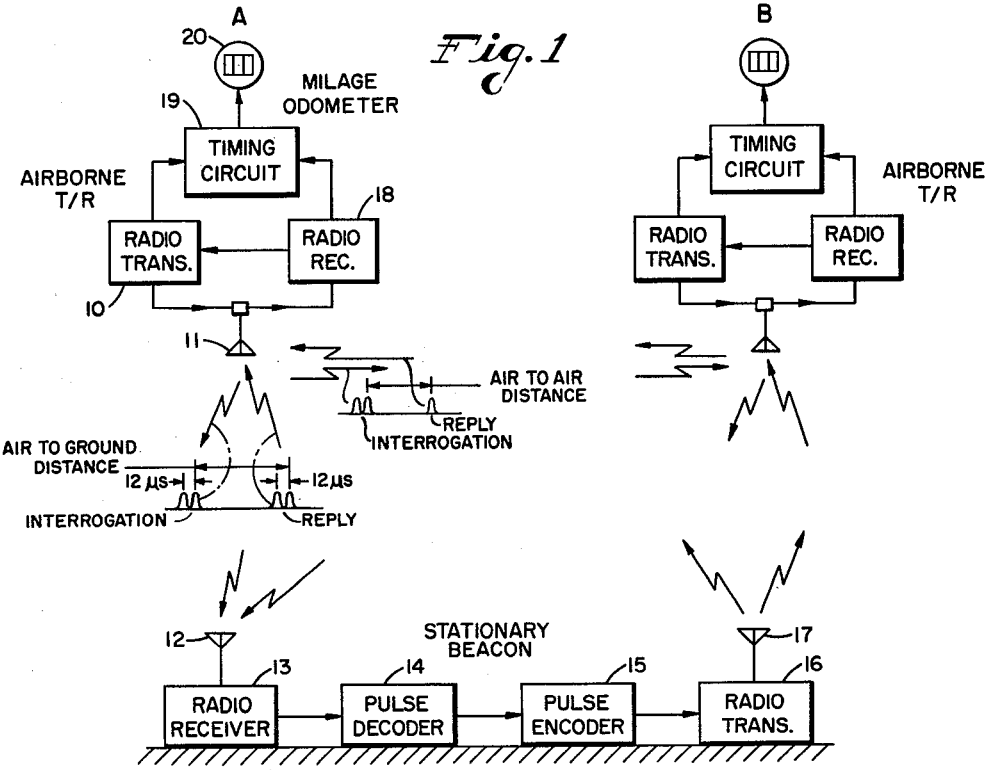
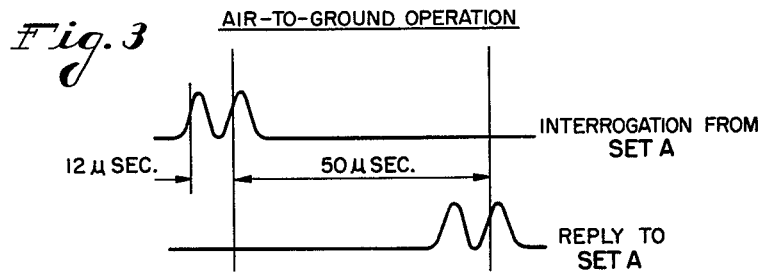
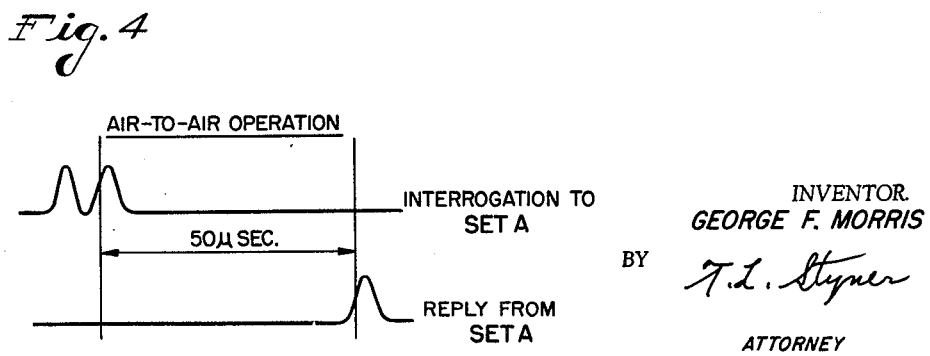
INVENTOR.
GEORGE F. MORRIS
BY *T. L. Styner*
ATTORNEY March 2, 1965

G. F. MORRIS 3,172,107

TACAN TEST EQUIPMENT

Filed March 18, 1963

United States Patent Office 3,172,107
Patented Mar. 2, 1965

3,172,107
TACAN TEST EQUIPMENT
George F. Morris, Pittsford, N.Y., assignor to General
Dynamics Corporation, a corporation of Delaware
Filed Mar. 18, 1963, Ser. No. 265,750
5 Claims. (Cl. 343—106)

This invention relates to test equipment and is particularly directed to means for exercising and testing the airborne unit of a radio navigation system.

The problems of testing radio navigating systems, particularly the system now commonly known as tacan, are formidable. As indicated in FIG. 1, as many as one hundred airplanes may determine azimuth and distance information with respect to a single ground-based tacan beacon. Each airborne unit comprises a radio transmitter and radio receiver with a timing circuit for measuring the transit time of interrogating radio signals to the ground-based beacon and replies to the receiver. It is now possible to transmit interrogating pulses from one airplane to another and to receive replies from the other to obtain range information between airplanes without reference to the ground-based beacon.

The object of this invention is to provide test equipment for exercising, testing and calibrating each airborne tacan unit which is capable of air-to-ground operation as well as air-to-air operation.

The objects of this invention are attained by test equipment which will simulate the ground-based beacon equipment to test the airborne unit in its air-to-ground mode of operation. In addition, the test equipment will simulate an airborne unit to exercise and test the airborne unit under test in air-to-air mode of operation.

Other objects and features of this invention will become apparent from the following description of one embodiment of the invention shown in the accompanying drawings in which:

FIG. 1 is a block diagram of an entire tacan system capable of air-to-ground and air-to-air modes of operation;

FIG. 2 is a schematic circuit diagram of the test equipment for exercising and testing an airborne tacan unit of the type shown in FIG. 1;

FIG. 3 shows an example of one set of interrogating and reply pulses employed in the system of FIG. 1 during air-to-ground operation; and FIG. 4 shows an example of one set of interrogating and reply pulses employed in the system of FIG. 1 during air-to-air operation.

The airborne navigation units of the type shown at A or B in FIG. 1 each comprises a radio transmitter 10 and a radio receiver 18 for transmitting pulses of microwave energy to and receiving pulses of microwave energy from the omnidirectional antenna 11. The radio frequencies employed in currently standardized tacan equipments are between 1025 and 1150 megacycles, divided into 126 channels of 1 mc. each. Transmitting and receiving frequencies are 63 mc. apart. The microwave energy of the selected transmitting channel is modulated with randomly spaced pairs of pulses, the pulses of each pair being of 3 microseconds duration and precisely spaced 12 microseconds peak-to-peak. The omnidirectional antenna 12 of the radio receiver 13 at the ground-based beacon receives all interrogating pulses of one microwave frequency from all aircraft within range of the beacon. The received pulses are each demodulated and applied to the pulse decoder 14. At this point it will appear that one useful purpose of the pulse pairs is to make the beacon receptive only of the pulse pairs, to the exclusion of radio noise and random atmospherics. The output of the pulse decoder, now comprising random single pulses, is applied to the pulse encoder 15 to generate 12 microsecond spaced pulse pairs. The newly generated pulse pairs modulate the radio transmitter 16 which radiates from antenna 17 microwave signals displaced 63 mc. from the received interrogation signals. Retransmission of the pulse pairs is delayed a precise predetermined period of time which in presently standardized equipment is 50 microseconds. The reply signals from beacon antenna 17 will be received by all airborne antennas 11, but will be accepted only by the one airborne unit which originated the random pulse pairs. The mechanism for excluding at airborne unit A all reply pulses except those received in response to interrogations of unit A includes a gate, not shown, operated by the highly individualistic random interrogating voltages of unit A. The delay between transmission of interrogations and reception of replies is equal to the 50 microsecond delay time in the ground-based beacon plus the expected round trip transit time between the airborne unit and the beacon. Timing circuits 19 compute this transit time and operate the mileage odometer 20 to indicate to the pilot the miles to the beacon. Circuits for deriving azimuth information are not considered here.

The system of FIG. 1 is capable of air-to-air mode as well as air-to-ground mode of operation. Each airborne unit may receive double pulse interrogations from other airborne units and reply with single pulses, not double pulses, so that the range between airborne units may be indicated on the odometers of all communicating units. Replies between airborne units comprise single pulses of microwave energy so that the airborne equipment may distinguish between replies and interrogations.

The test equipment shown in FIG. 2, according to this invention, is capable of exercising and testing airborne unit A in both its air-to-ground mode and in its air-to-air mode. That is, the test equipment 30 will function either as a ground-based beacon or as an airborne unit. The radio transmitter 10 is coupled through the transmission line 31 and the adjustable attenuator 32 to the input of radio receiver 33. The received double pulses are decoded in decoder 34 and applied to the amplifier 35. The decoder 34 comprises a conventional delay line, not shown, of precisely 12 microseconds and a coincidence gate which will respond only to two pulses 12 microseconds apart. The single output pulse of the coincidence gate is applied to the amplifier 35. The single pulse from amplifier 35 is directed to an OR gate provided by the double triode 40 through two paths or control circuits. One path 41 is connected directly to grid 40a of the double triode and the other path 42 includes the delay line 43, and is connected to the grid 40b of the double triode. The result is two pulses at output terminal 44 spaced an amount determined by the delay line 43. Preferably, the delay line 43 is tapped and is adjustable in small steps above and below and including the 12 microsecond delay. These double pulses are applied to the modulator of the radio transmitter 45 and are transmitted via transmission line 46 and attenuator 47 to the radio receiver 18 of the tacan set under test. The equipment thus far described will function like the beacon station and will exercise and test the airborne unit A in its air-to-ground mode. The waveforms of FIG. 3 indicate the approximate shape and spacial relation of the interrogating signals received by and the reply signals transmitted from the test set of FIG. 2 operating in the air-to-ground mode. The demodulated double pulses of the airborne radio receiver 18 are applied to the decoder 18a and, hence, to the timing circuits 19 to operate the odometer 20. The odometer 20 will indicate mileage corresponding to all delays introduced in the test circuit. The calibrated and adjustable delay device 48 may, for example, be inserted in the test circuit, as between the radio receiver 33 and the decoder 34, to simulate any desired radio distance during test.

To enable one airborne unit, A, to initiate interrogations for another airborne unit, B, each airborne unit is provided with the (two pulse) pulse-pair generator 50. The pulse-pair generator is preferably of the type disclosed in the U.S. patent to Donald A. Dutton, 3,058,011. The pulse-pair generator is coupled directly to the modulating circuits of radio transmitter 10. The output of decoder 18a, through the air-to-air switch 51, is also connected into the modulator of transmitter 10. In air-to-air mode, the output of single pulses of the decoder 18a is transmitted via the radio circuit and is decoded only by the airborne unit B which initiated the interrogating pulse pairs. FIG. 4 shows the time relation of the signals between airborne units in the air-to-air mode, where single pulse replies are employed.

To simulate the air-to-air interrogating operation of unit B in cooperation with unit A, the test set 30 is provided, according to this invention, with the random pulse generator 60. The generator 60 comprises the four-layer silicon diode 61 which exhibits high internal resistance until the anode-to-cathode voltage exceeds a threshold value whereupon a charge avalanche occurs and the internal resistance drops to near zero. Condenser 62 is charged slowly through resistance 63 from the positive source terminal 64 until breakdown of the diode occurs. The resulting sawtooth voltage waveform at terminal 65 is differentiated in the series condenser 66 and shunt resistor 67 to produce at junction 68 a sharp voltage spike. The pulse generator 60 is not synchronous and the pulse repetition frequency at junction 68 is unstable and assumes a mean value determined primarily by the resistances 69 and 70 in the discharge circuit of the diode. This mean pulse repetition frequency can be changed from a high PRF during the search phase and a low PRF during the tracking phase of operation by selectively short-circuiting resistor 70 with switch 71.

According to an important feature of this invention, the normal circuit 41 employed for air-to-ground testing may be open-circuited by the double throw switch 72. When operated to the "air-to-air" mode, switch 72 closes the circuit between the source 60 of random single pulses and the modulating circuit of the radio transmitter. The pulses of source 60 are also applied to the input to delay line 43 through coupling diode 74. Decoupling condenser 73 is sufficient to pass the pulses. The random single pulses at junction 68 now feed to the radio transmitter through two paths including the direct path through the air-to-air contact of switch 72 as well as through the delay line 43, to the double triode. If the delay line is adjusted to, say, 12 microseconds, random pulse pairs, spaced 12 microseconds apart in each pair, appear on the output line 46 of the transmitter 45. The pulse pairs are detected in the receiver 18 of the unit A under test and are decoded in decoder 18a. The resulting single pulses are applied through switch 51 to the radio transmitter 10 and are radiated, or returned, via cable 31 to the test set. The timing circuit 80 and the odometer 81 at the test set for comparing the time of occurrence of the reply pulse with respect to the last of the interrogating pulse pairs will indicate the transit time of the test signal and the odometer of the test set should show the same mileage as the mileage shown on odometer 20. Switch 82 is employed for selecting either the single pulse air-to-air replies or the decoded double pulse air-to-ground replies for application to the timing circuit 80.

It is now apparent that the test set 30 will test the capabilities of the airborne unit A in both to the air-to-ground and the air-to-air modes of operation.

While there has been shown and described a specific embodiment of the invention, other modifications will readily occur to those skilled in the art. It is not, therefore, desired that this invention be limited to the specific arrangement shown and described, and it is intended in the appended claims to cover all modifications within the spirit and scope of the invention.

What is claimed is:

1. A test set for exercising and testing tacan range measuring equipment of the type which transmits pairs of interrogating pulses of microwave energy to a distant transponder, and of receiving and decoding reply pulses, in pairs or singly, with timing circuits for measuring the elapsed time between interrogating pulse transmission and reply pulse reception; said test set comprising a transmitter and a receiver for transmitting pulse signals to and receiving pulse signals from the tacan equipment under test, a decoder connected to said receiver for generating a single pulse in response to received interrogating pulse pairs of predetermined spacing, a first path and a second path connected between said decoder and said transmitter, a delay line in said first path for delaying said single pulse with respect to the pulse in said second path to modulate said transmitter with pulse pairs of said predetermined spacing, a source of random pulses, said source of random pulses being connected to said transmitter through said delay line, switch means in said second path for selectively disconnecting said transmitter to said decoder or to said source of random pulses.

2. A tacan test set comprising a pulse decoder for deriving a single pulse in response to each received interrogating signal, a double pulse encoder connected to said decoder for generating a pair of pulses in response to each interrogating single pulse, a local asynchronous pulse generator, and means for connecting the output of said generator to said encoder.

3. A test set for exercising and testing the radio transmitter-receiver of a tacan airborne unit capable of comparing transmitted interrogation double pulse signals with received reply signals for measuring air-to-ground range and capable of relaying signals for measuring air-to-air range; said test set comprising a transmitter, an OR gate with an output circuit connected to said transmitter for modulating said transmitter, a first control circuit and a second control circuit connected to the input of said OR gate, a delay means connected in said first circuit, said first and second circuits being connected to a pulse decoder, an asynchronous pulse generator, and means for connecting said generator to said OR gate through first and second control circuits for initiating double pulse interrogation signals.

4. A test set for exercising and testing a tacan range measuring equipment of the type which is capable of interrogating either a ground-based beacon or another airborne unit with, respectively, double pulse and single pulse replies, said test set comprising a transmitter, a double pulse decoder, a local asynchronous pulse generator, a delay device connected between said transmitter on the one hand and said decoder and said generator on the other hand, and switch means for selectively coupling said generator directly to said transmitter.

5. A test set for exercising and testing a tacan range measuring equipment, said test set comprising a transmitter, an OR gate having an output circuit connected to said transmitter, said gate having two control circuits, a delay device in one of said control circuits, a pulse-pair decoder responsive to interrogating signals for operating said two control circuits, and an asynchronous pulse generator connected through said delay device to said gate, and switch means in the other control circuit for selectively coupling either said generator or said decoder to said gate so that said transmitter will transmit both single pulse replies in response to said decoder or double pulse interrogations initiated by said generator.

References Cited by the Examiner
UNITED STATES PATENTS 2,912,688   11/59   Faymoreau et al. _____ 343—106

CHESTER L. JUSTUS, *Primary Examiner.*